J. G. CARREIRA.
AMBULANCE AND MATERIAL TRANSPORTATION VEHICLE.
APPLICATION FILED OCT. 9, 1917.
1,292,251.
Patented Jan. 21, 1919.
21 SHEETS—SHEET 6.
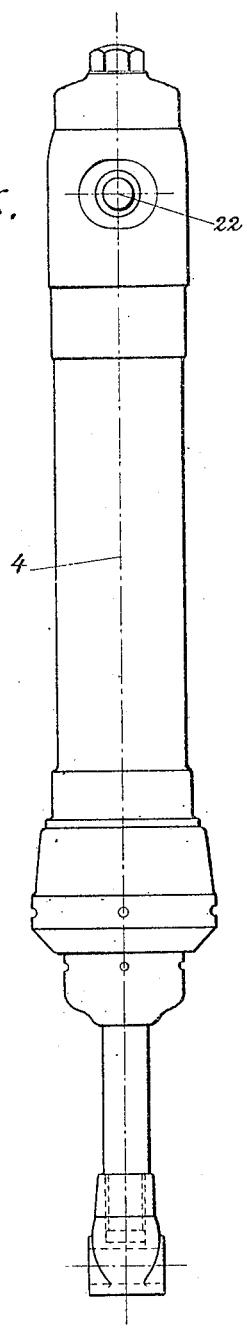
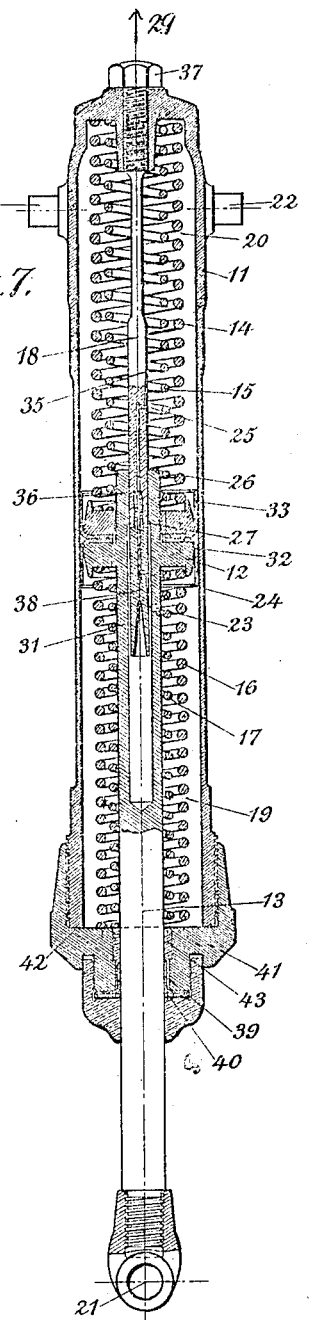
INVENTOR:
João Guimarão Carreira
BY
ATTY

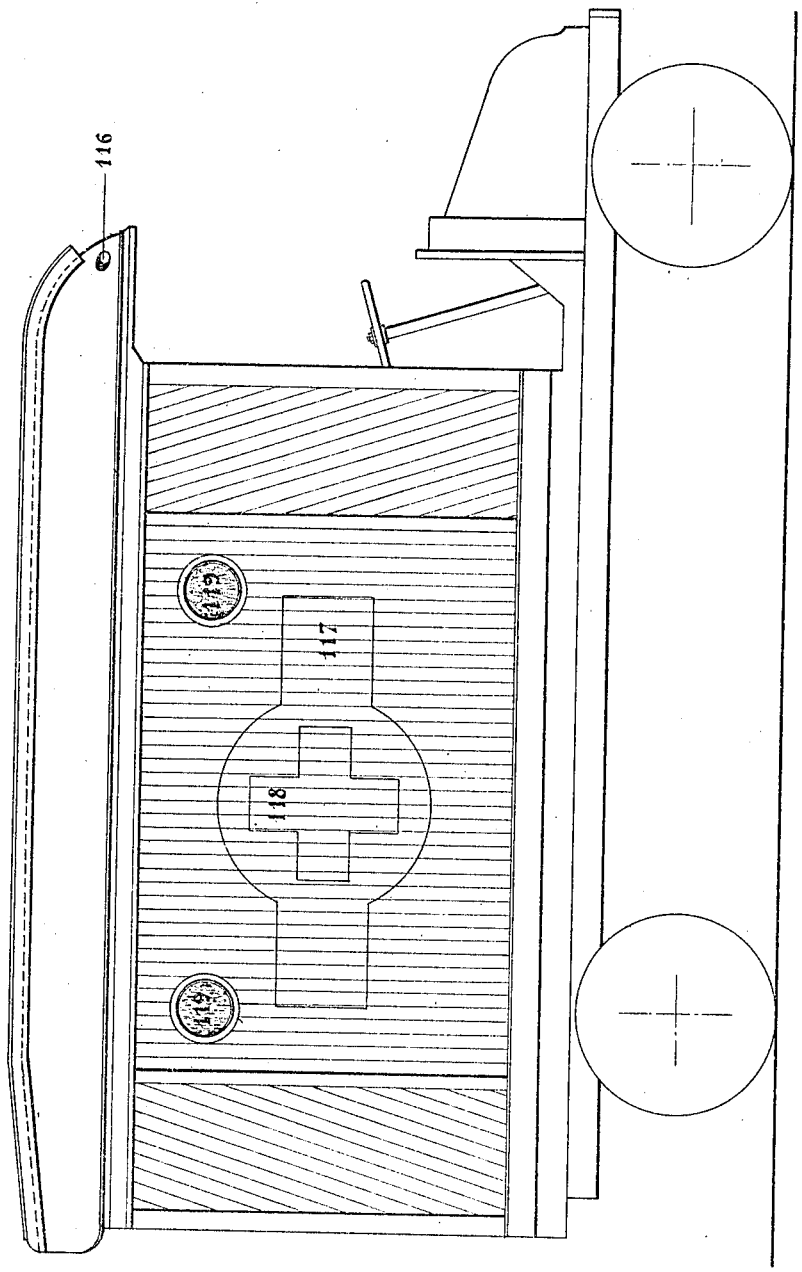

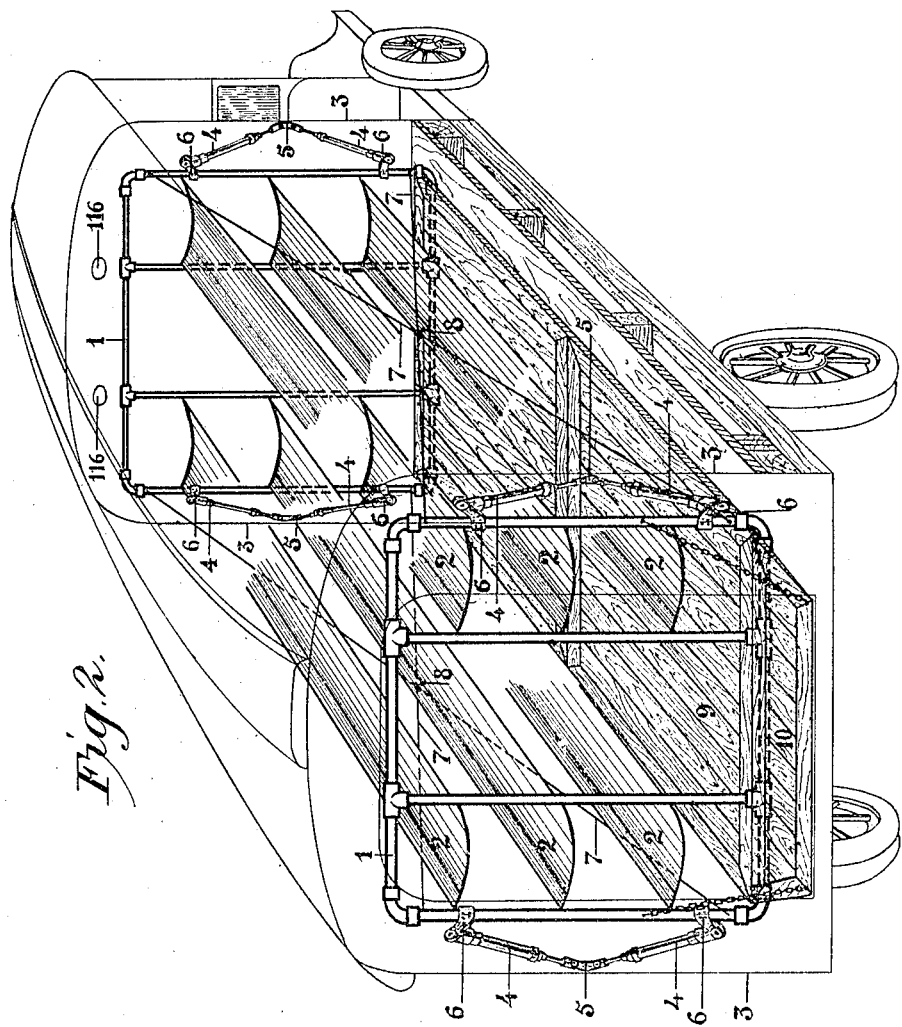

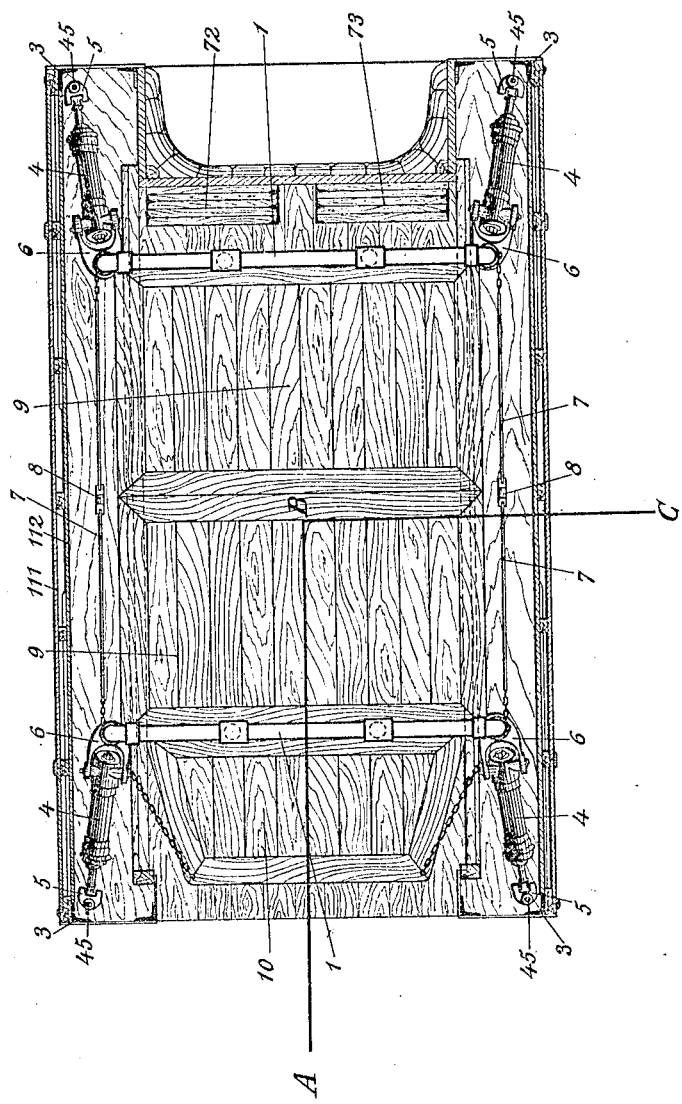

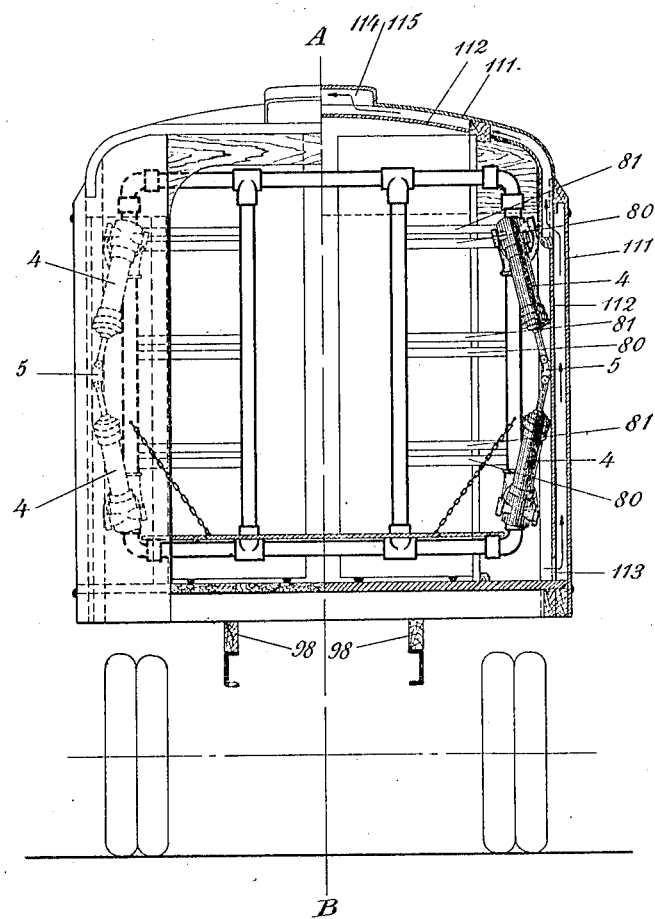

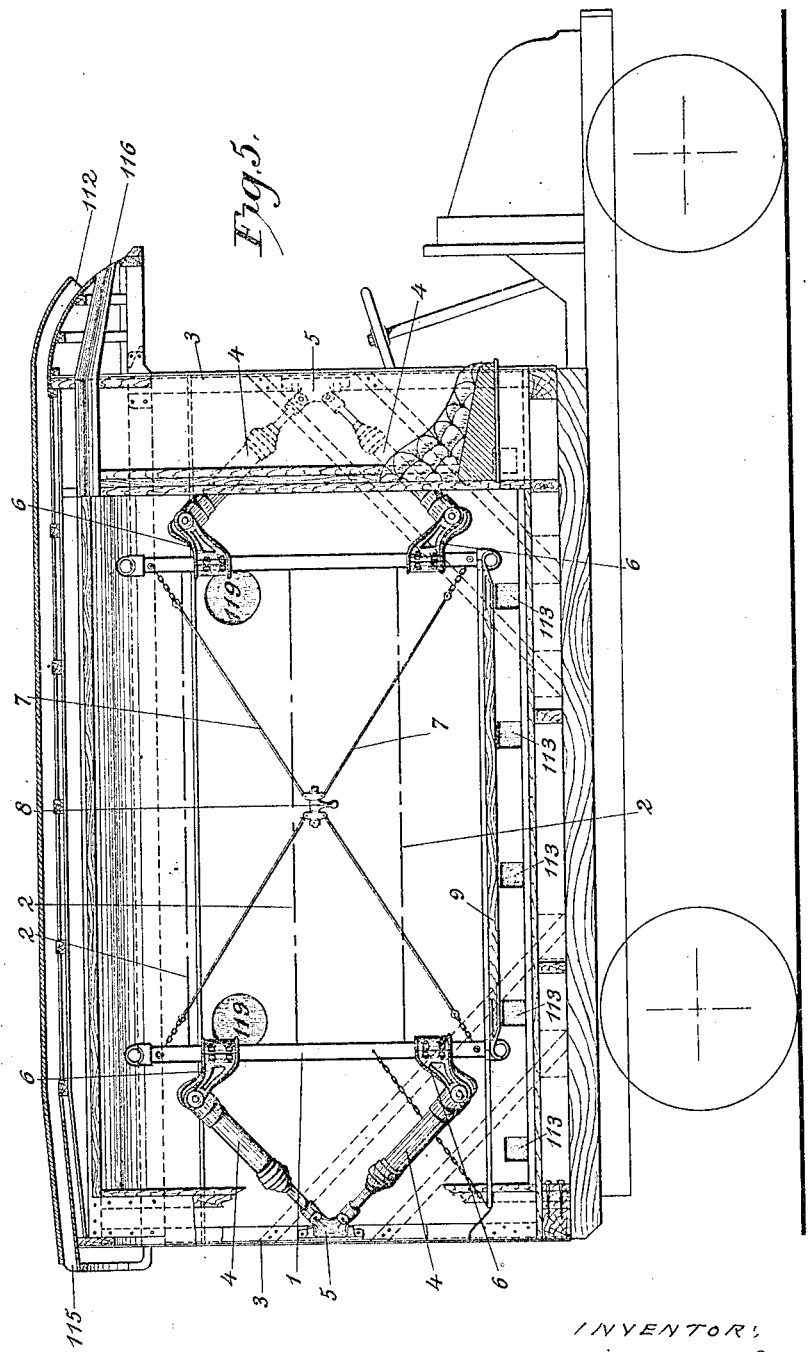

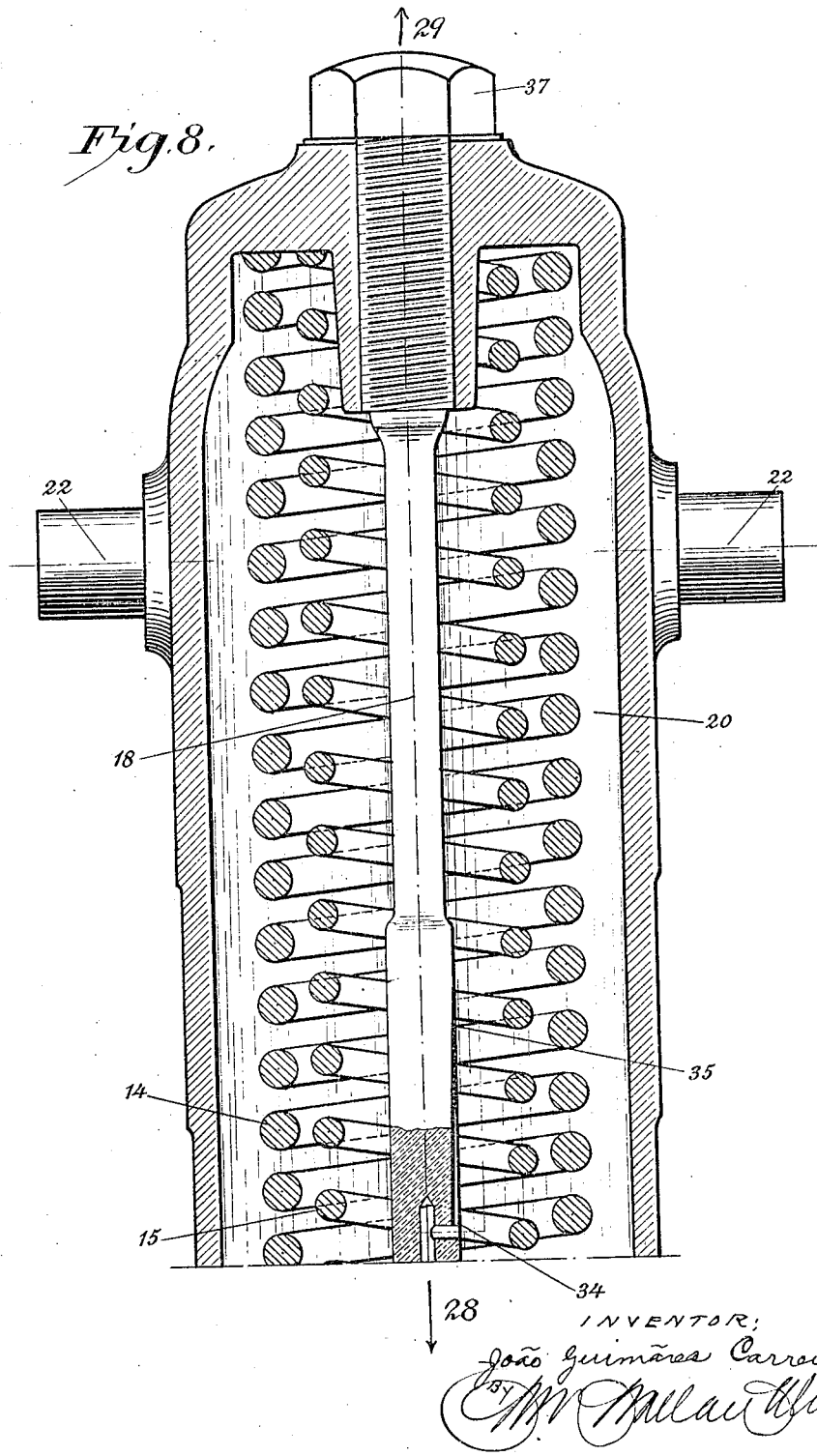

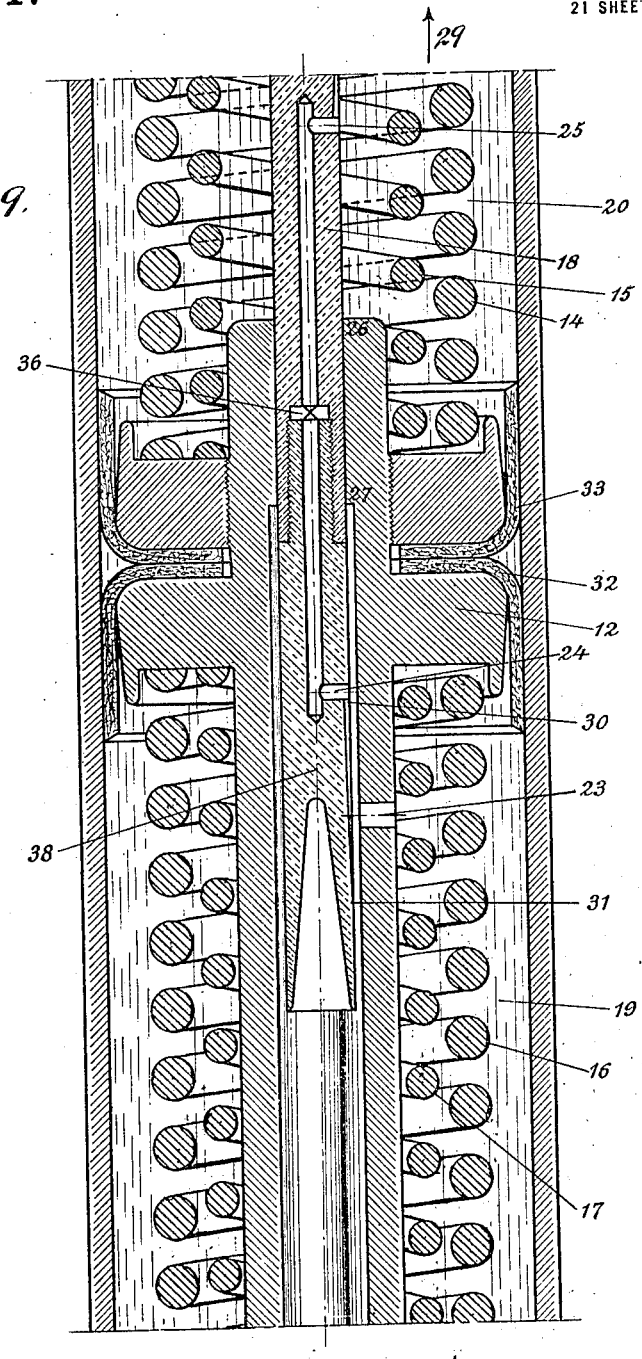

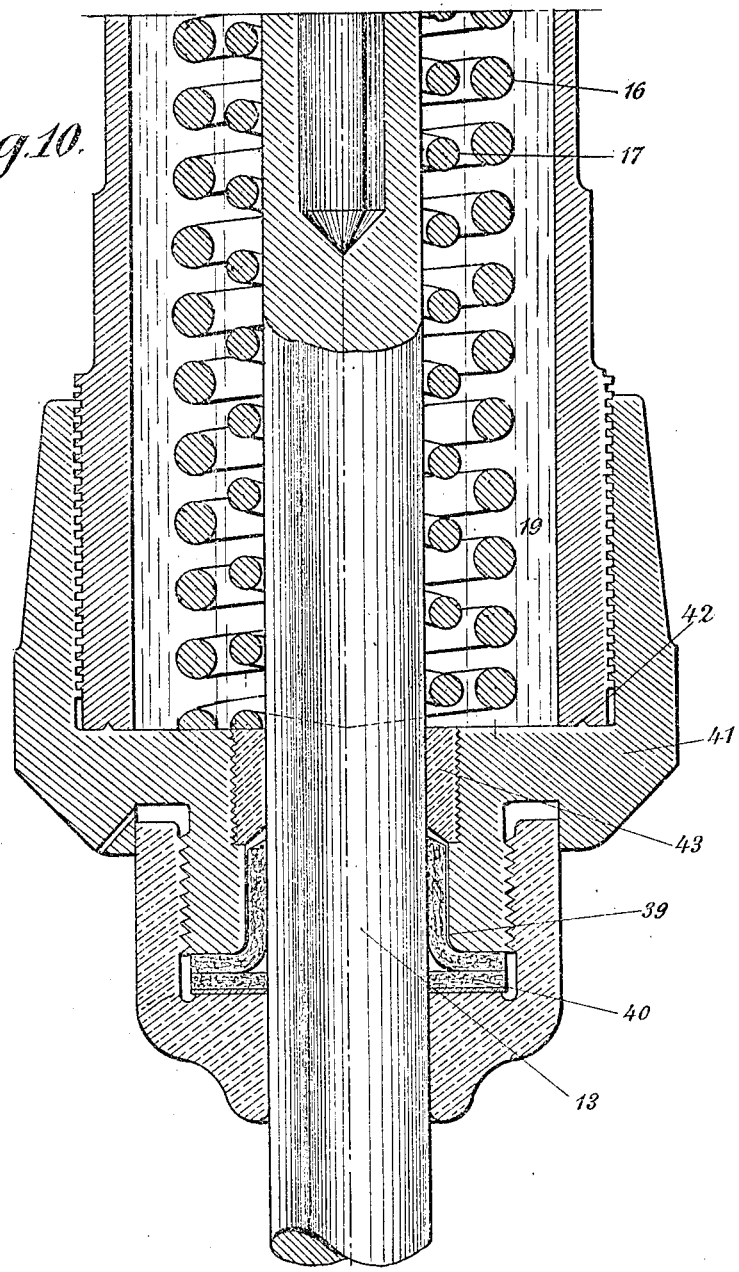

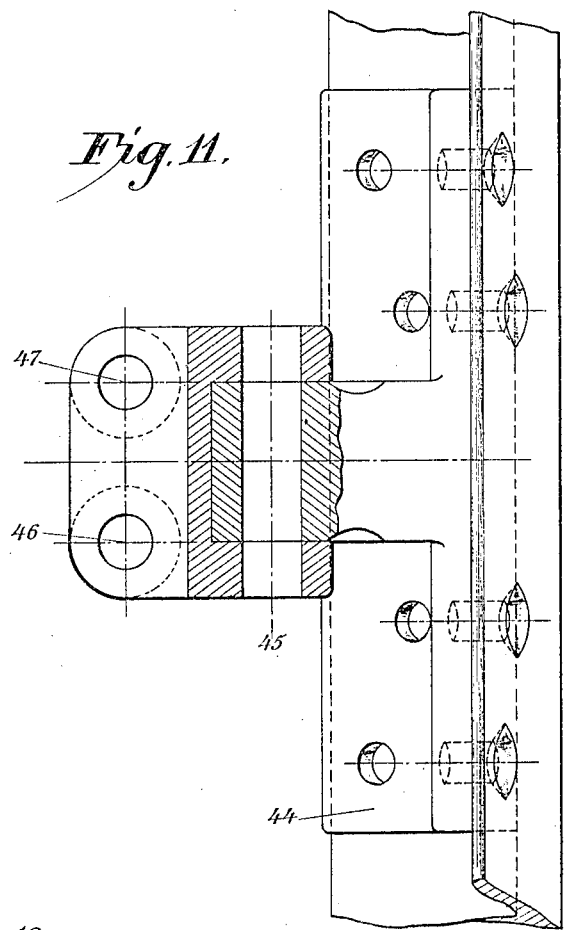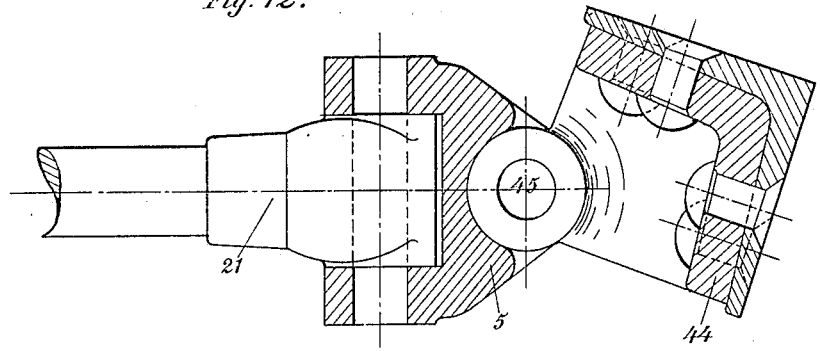

J. G. CARREIRA.
AMBULANCE AND MATERIAL TRANSPORTATION VEHICLE.
APPLICATION FILED OCT. 9, 1917.
1,292,251.
Patented Jan. 21, 1919.
21 SHEETS—SHEET 11.
Fig. 13.
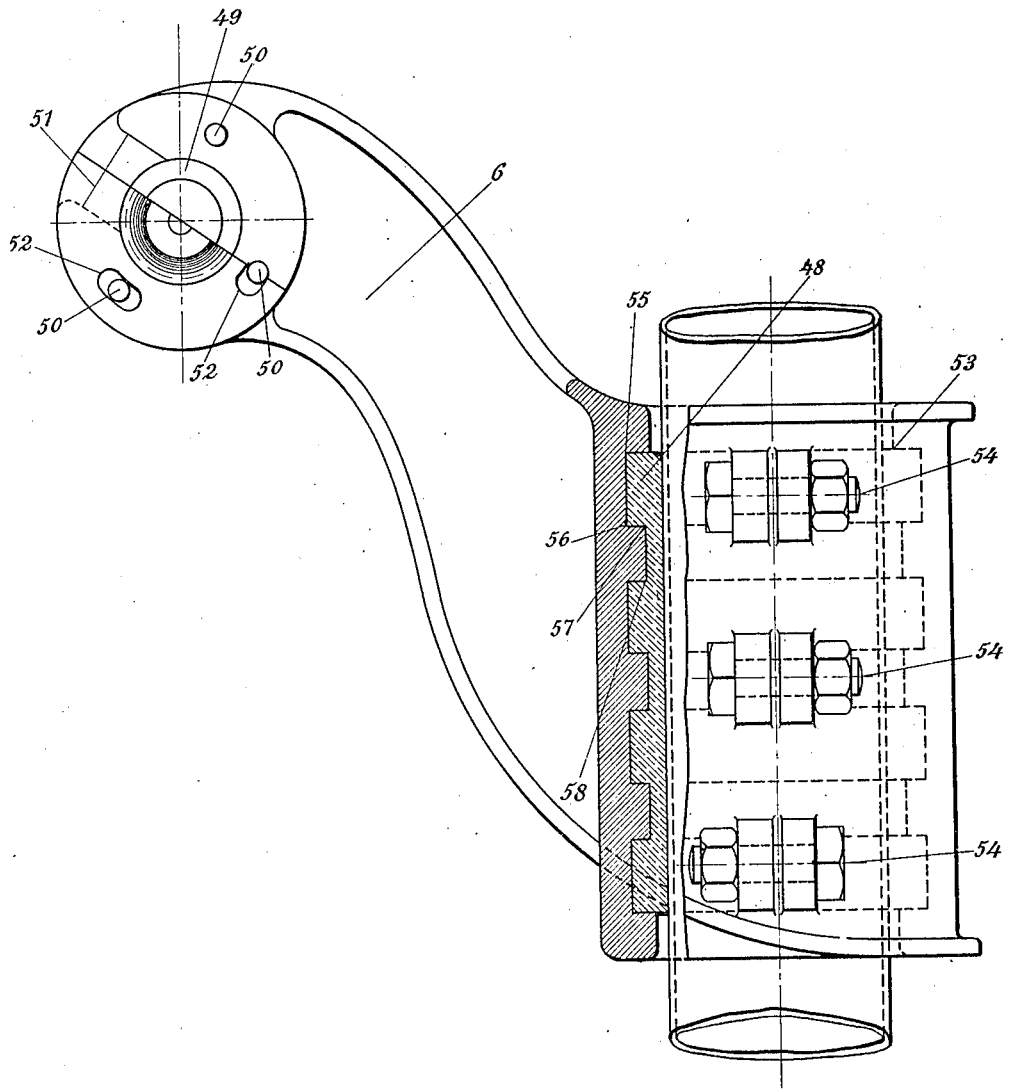
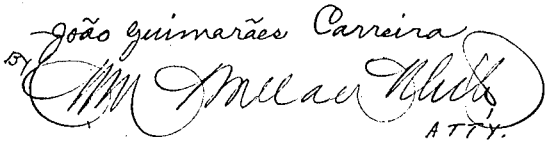

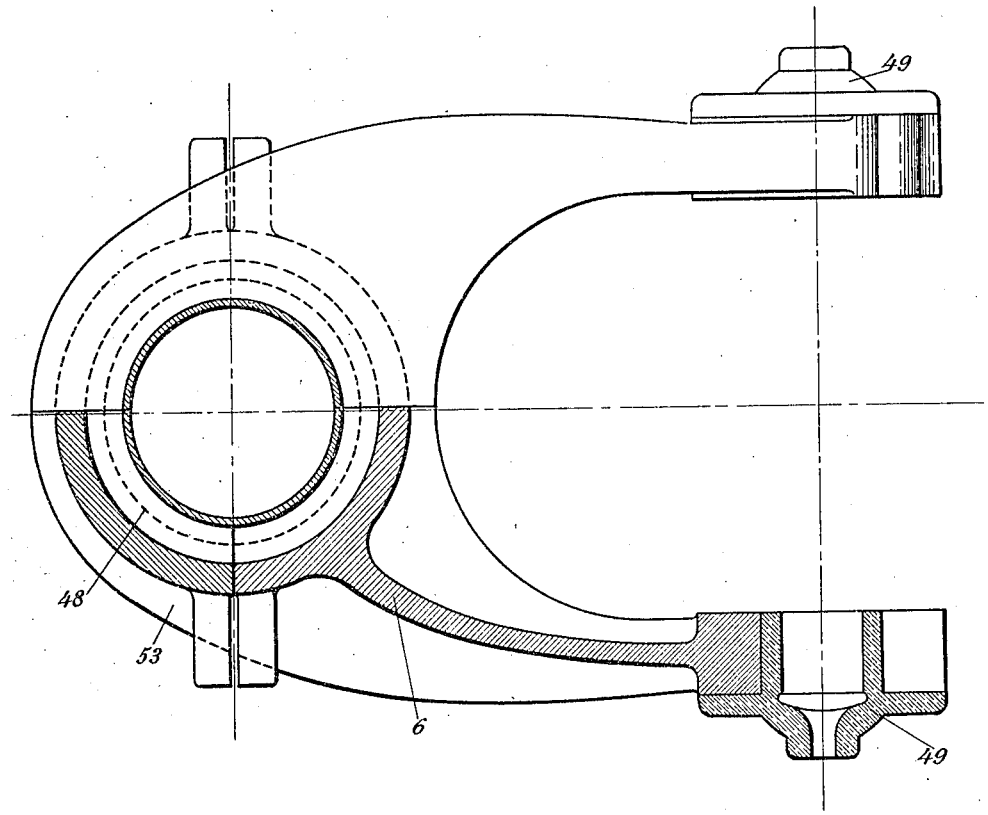

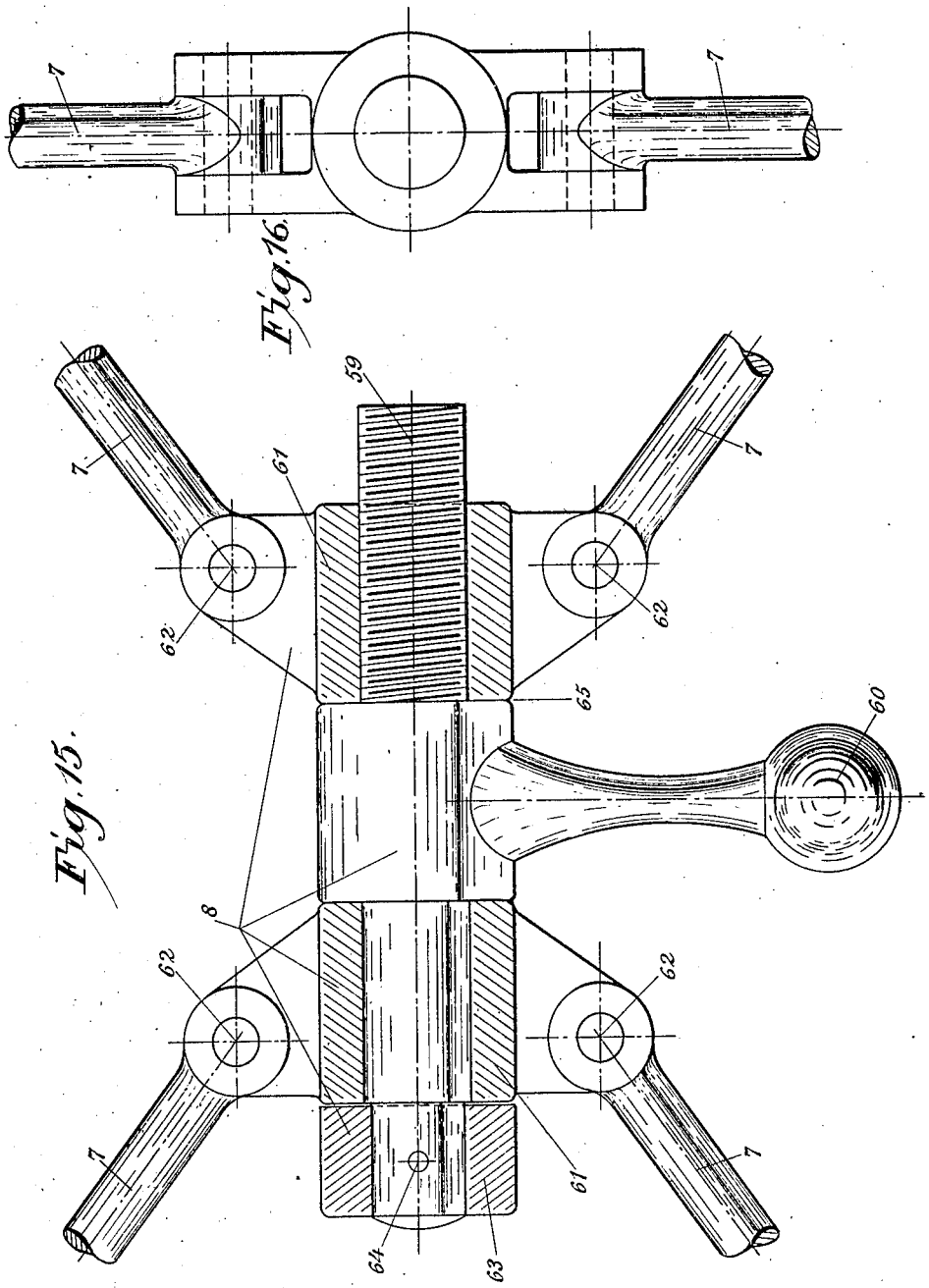

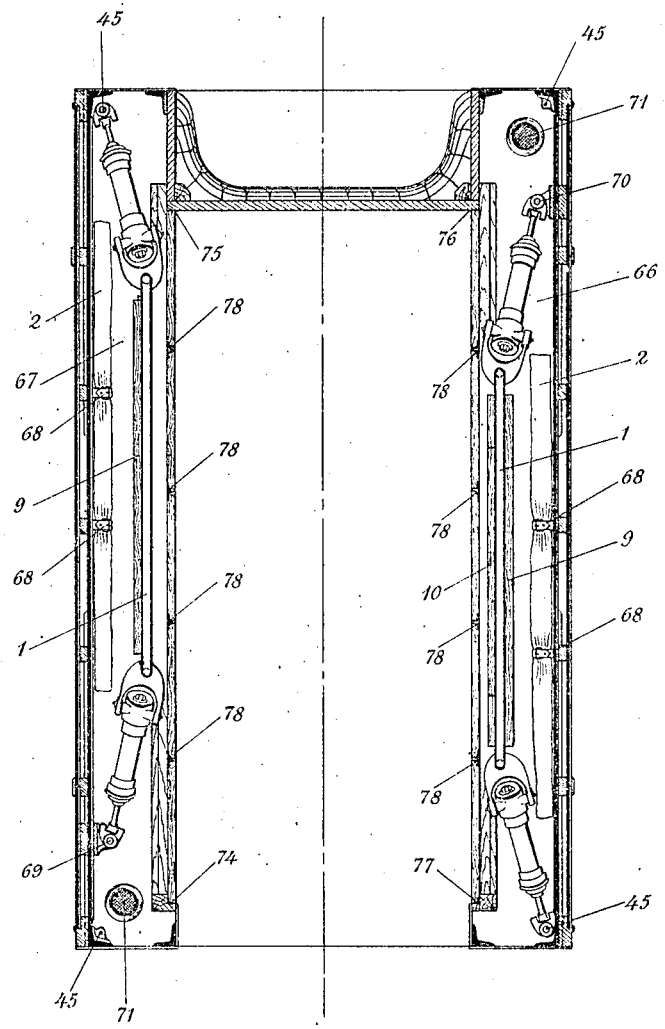

J. G. CARREIRA.
AMBULANCE AND MATERIAL TRANSPORTATION VEHICLE.
APPLICATION FILED OCT. 9, 1917.

1,292,251.

Patented Jan. 21, 1919.
21 SHEETS—SHEET 15.

INVENTOR:
João Guimarães Carreira
ATT'Y.

J. G. CARREIRA.
AMBULANCE AND MATERIAL TRANSPORTATION VEHICLE.
APPLICATION FILED OCT. 9, 1917.
1,292,251.
Patented Jan. 21, 1919.
21 SHEETS—SHEET 16.
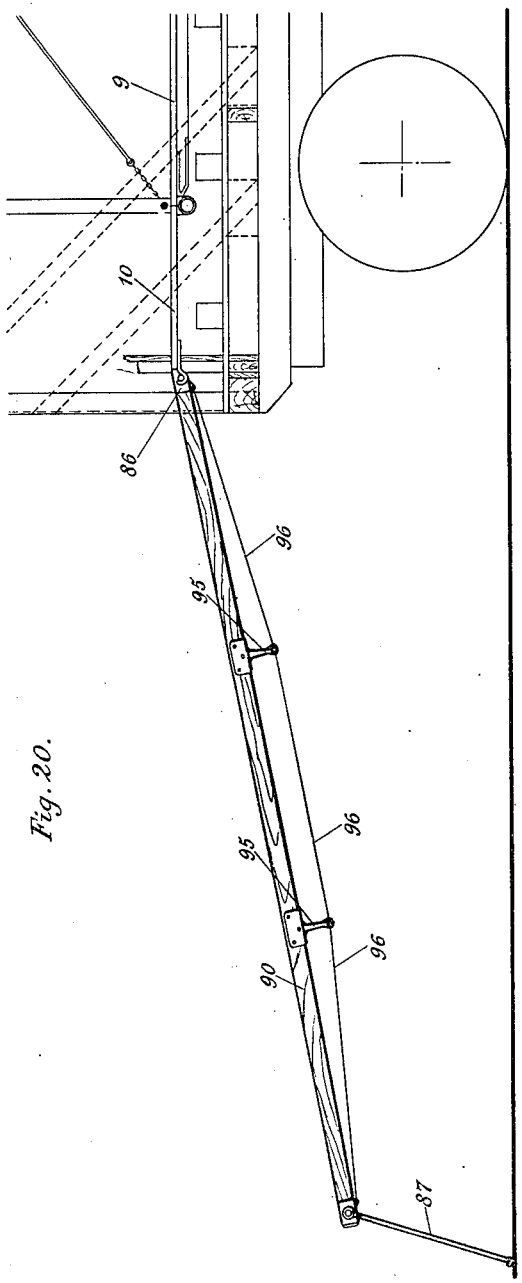
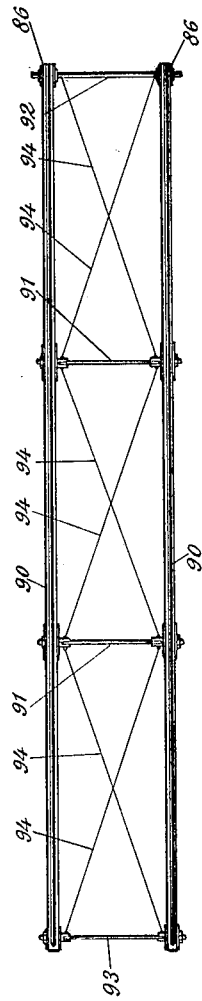

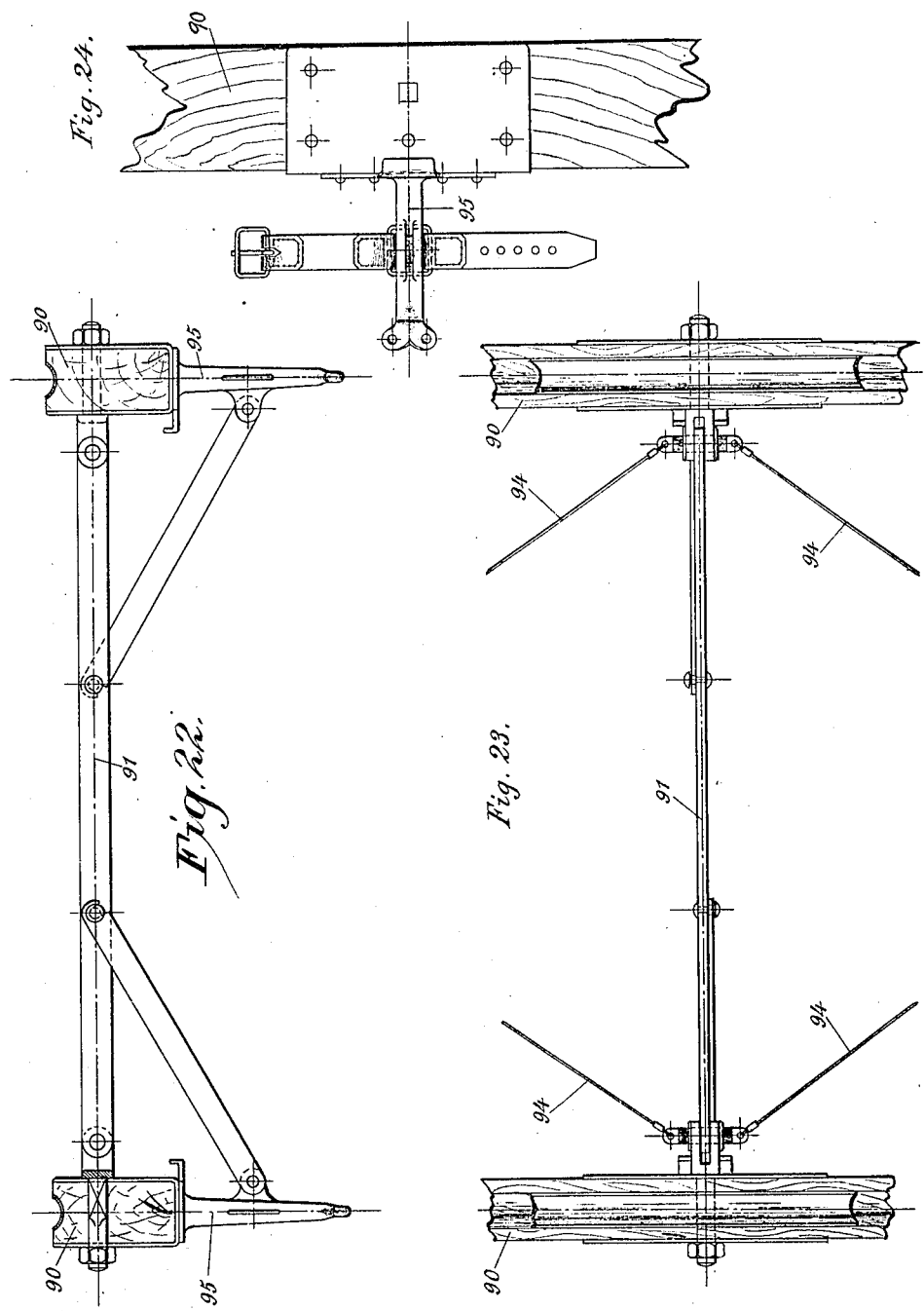

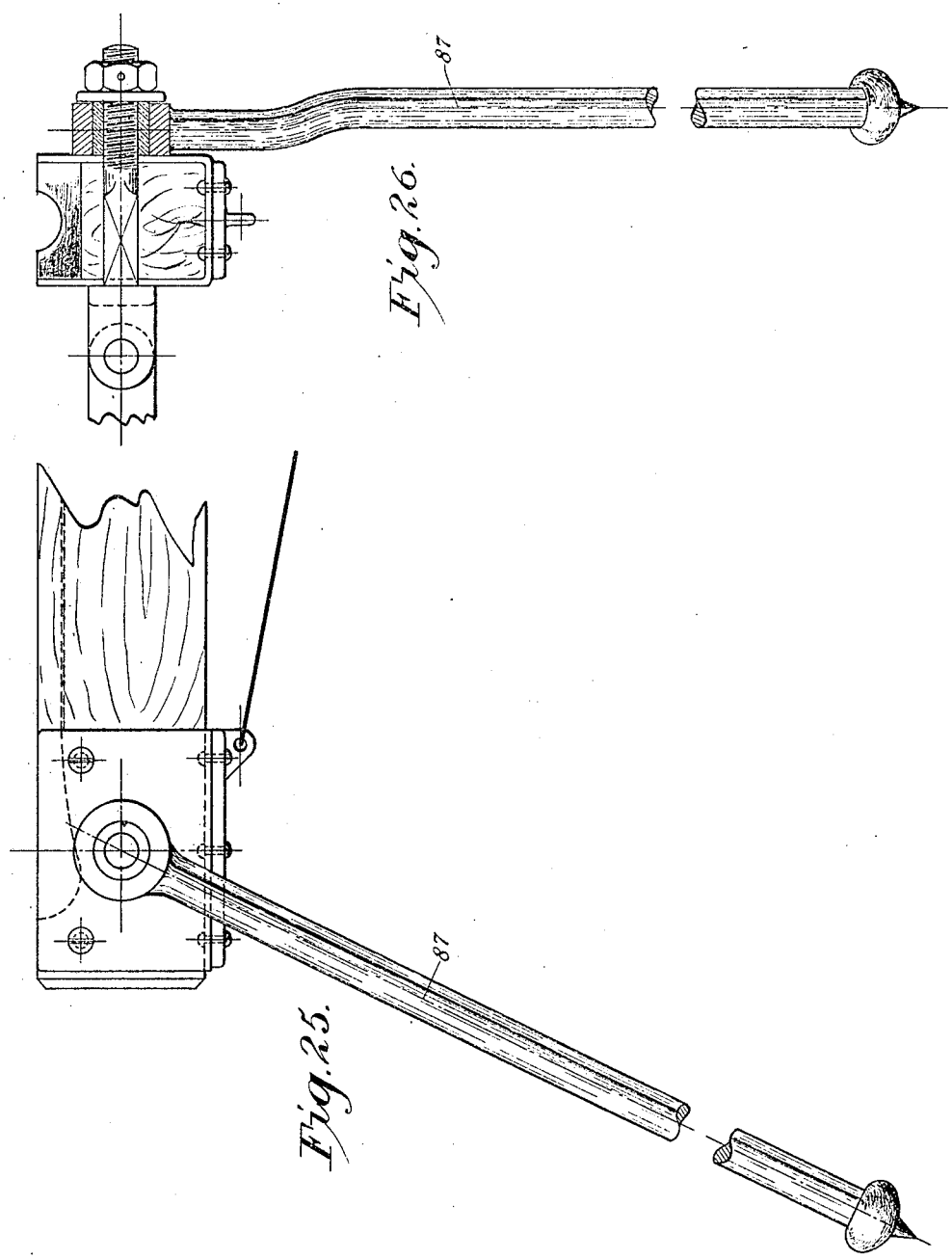

J. G. CARREIRA.
AMBULANCE AND MATERIAL TRANSPORTATION VEHICLE.
APPLICATION FILED OCT. 9, 1917.
1,292,251.
Patented Jan. 21, 1919.
21 SHEETS—SHEET 19.
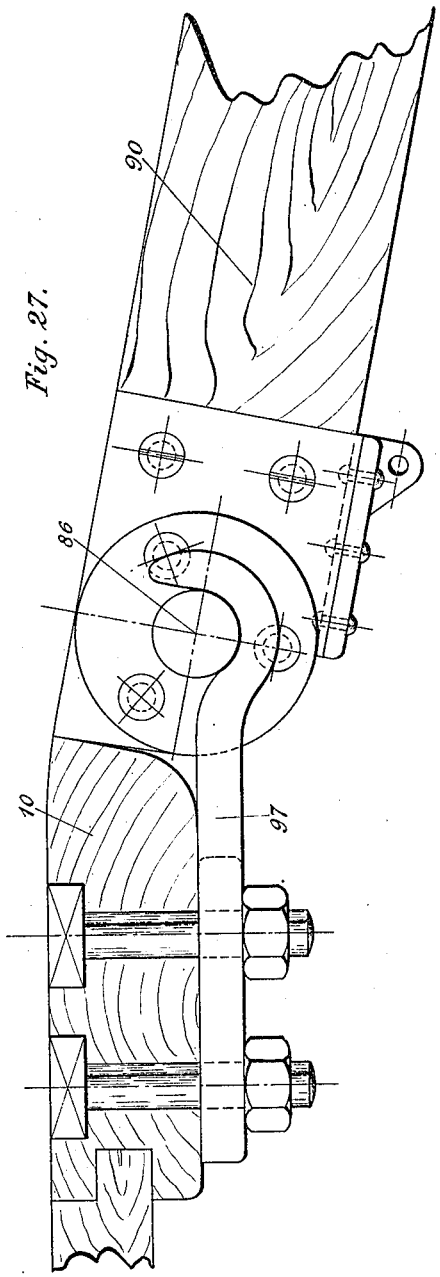
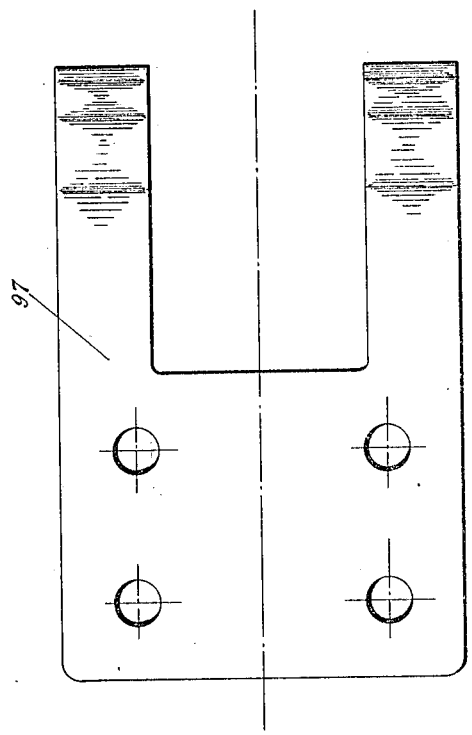
INVENTOR:
João Guimarães Carreira
BY
ATTY.

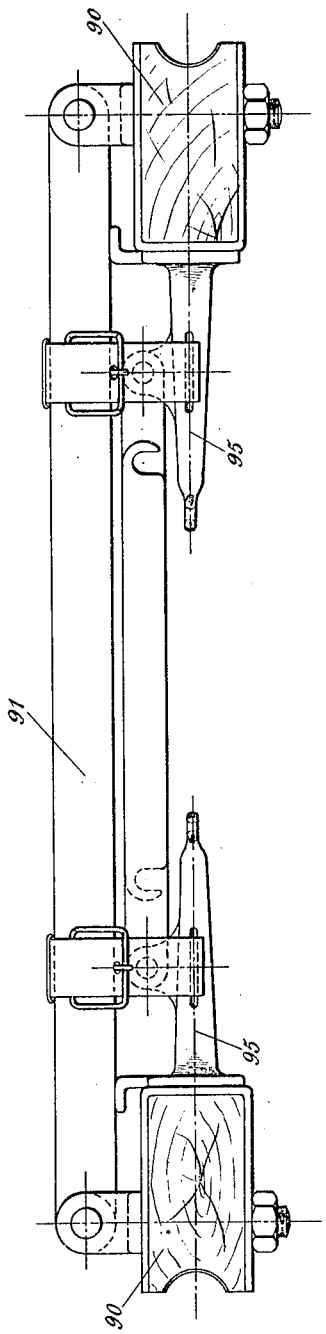

J. G. CARREIRA.
AMBULANCE AND MATERIAL TRANSPORTATION VEHICLE.
APPLICATION FILED OCT. 9, 1917.
1,292,251.
Patented Jan. 21, 1919.
21 SHEETS—SHEET 21.
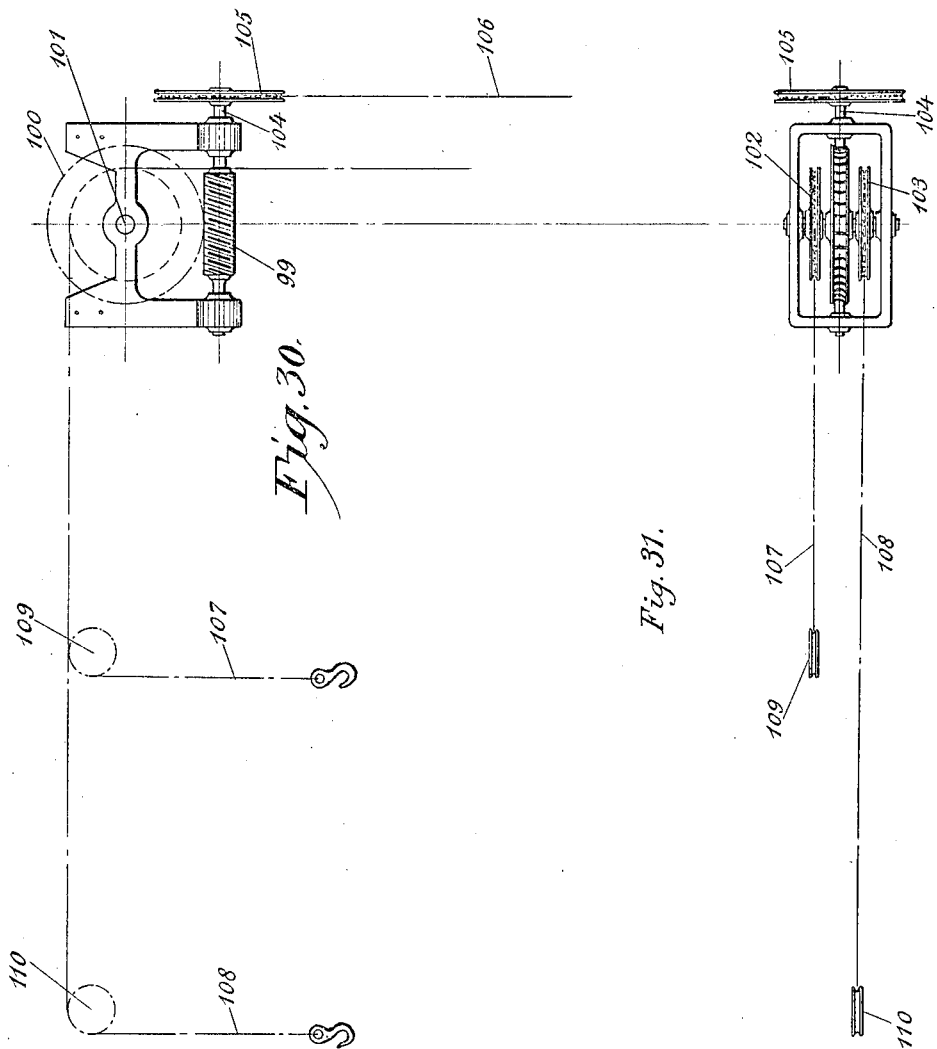
INVENTOR
João Guimarães Carreira
BY
ATTY.

UNITED STATES PATENT OFFICE.

JOÃO GUIMARÃES CARREIRA, OF LISBON, PORTUGAL.

AMBULANCE AND MATERIAL-TRANSPORTATION VEHICLE.

1,292,251. Specification of Letters Patent. Patented Jan. 21, 1919.

Application filed October 9, 1917. Serial No. 195,539.

*To all whom it may concern:*

Be it known that JOÃO GUIMARÃES CARREIRA, a citizen of the Brazilian Republic, residing at Lisbon, in the Republic of Portugal, has invented certain new and useful Improvements in Ambulances and Material-Transportation Vehicles, of which the following is a specification.

The subject of the present invention is "a special system for the transportation of sick, or wounded persons, or alternatively of merchandise."

This special system consists of: a spring supported framing which supports the stretchers in which the sick or wounded are carried: four pairs of "flexor" elements for the suspension of the said spring supported framing from the vehicle: four uprights attached to the underframe of the vehicle, and to which the above mentioned "flexor" elements are connected: special arrangements, provided for in the coach construction, for the easy and rapid stowage of the stretchers, the spring-supported framing, etc., in two aseptic compartments, when the vehicle is to be used for transporting merchandise, and also for the purpose of obtaining uniform temperature, and avoiding sudden variations, and for securing a hygienic surrounding atmosphere, by means of suitable ventilation.

The accessories indispensable to the especial system, are, a hinged inclined plane, by which the stretchers may be conducted from outside to the floor level of the spring supported framing, and a hoisting apparatus to raise them from the aforesaid floor level to the position which they are to occupy during transit.

The invention is set forth in the annexed drawings in which:

Figure 1 is a longitudinal elevation of the vehicle complete to which the system is to be applied.

Fig. 2 is a schematic drawing in perspective of the same vehicle, in order to render the arrangement more easy of comprehension.

Fig. 3 is a sectional plan of the same vehicle.

Fig. 4 is an end elevation of the back, half in elevation and half in section on planes A B C of Fig. 3.

Fig. 5 is a longitudinal section on plane A B of Fig. 4.

Fig. 6 is an exterior view of a complete "flexor" element of the spring supported frame.

Fig. 7 is a longitudinal section of the said "flexor" element.

Figs. 8, 9, 10 show in longitudinal section on a larger scale the section shown in Fig. 7 and are numbered in the natural order in which the parts of the "flexor" element are situated.

Fig. 11 is an elevation on the medial vertical plane of the universal joint by which two "flexor" elements of the spring-supported framing are connected to one of the uprights fixed in the vehicle, and of the provision for movement of the said "flexor" elements in two directions, vertical and horizontal.

Fig. 12 is a plan and half section of the piece shown in Fig. 11.

Fig. 13 shows, partly in outside elevation the bearing bracket for connection of a "flexor" element to the spring supported framing; and partly in section the bronze bearing bushes.

Fig. 14 is a plan, half exterior, half in section of the bracket shown in Fig. 13.

Fig. 15 shows half in outside view, half in longitudinal section, the stretching screw of the suspension links of the spring supported frame.

Fig. 16 is an end view of the part shown in Fig. 15.

Fig. 17 is a sectional plan of the vehicle showing the method of stowing, in two aseptic compartments, the stretchers, the spring supported frame, etc., when the vehicle is transformed so as to serve for the transport of goods or merchandise, and also shows the position in which is placed the "formol" sterilizer.

Fig. 20 is a longitudinal elevation of the hinged inclined plane, by which the stretchers are conveyed from outside to the floor level of the spring supported framing, in its working position.

Fig. 21 is a plan view of the aforementioned hinged inclined plane.

Fig. 22 is a cross section, to a larger scale of the hinged inclined plane shown in Fig. 20.

Fig. 23, is a plan of the inclined plane as shown in Fig. 22.

Fig. 24 shows the method of fixing one of the tie rods to one of the side booms of the hinged inclined plane.

Fig. 25 shows the method of connecting the hinged legs of the inclined plane.

Fig. 26 is a cross section through the axis of the hinge of the legs of the hinged inclined plane as shown in Fig. 25.

Fig. 27 shows the method of linking the head of the inclined plane to the landing or platform of the floor of the spring-supported framing.

Fig. 28 is a plan of the hinge plate fixed to the floor of the spring-supported framing and which carries the end of the inclined plane as shown in Fig. 27.

Fig. 29 is a cross section to an enlarged scale of the hinged inclined plane when closed up.

Fig. 30 is a schematic drawing of the hoisting gear for the stretchers and by which the latter are lifted from the floor level of the spring-supported framing to the places which they are to occupy and vice versa.

Fig. 31 is a plan view of the gear shown in Fig. 30.

The several parts or organs are distinguished by the same numbers in the various figures.

Figure 18:
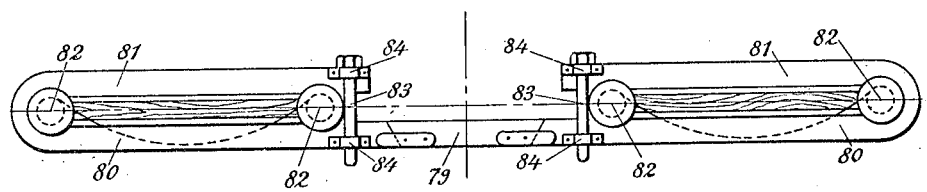
Fig. 18 shows the horse shoe supports which carry the stretchers in the spring mounted framing.

Turning now to a vehicle completely fitted with the special system we proceed to describe the same in detail.

It consists primarily of a coach body of the type shown in Fig. 1 in the interior of which is fitted a spring supported framing, (1. Fig. 2) which carries the stretchers 2, this framing being hung from four uprights 3, of angle bar, by means of eight "flexor" elements 4. Fig. 2., arranged in pairs, and acting in opposition, connected together at 5 and to the framing at 6—Fig. 2.

The spring-supported framing 1 consists of two similar parts, placed one at the fore end and the other at the rear end of the vehicle, being kept in their proper relative position in one direction by the eight "flexor" elements 4, and in the other longitudinally from both sides by a system of links 7. Figs. 2, 3, 5, 15 and 16. The tension of these links and therefore the invariable equilibrium of the entire spring-supported framing is derived from and maintained by means of a tension or stretching screw, 8 Figs. 2, 3, 5 and 15.

The spring-supported framing is furnished at its lower part with a floor 9, Figs. 2, 3, 4 and 5 independent of the coach floor, which may be folded, and is intended not only for the reception of hospital stretchers when such are of necessity employed, but may also serve for the transport of seated patients not requiring stretchers, who may thus enjoy the advantages of the spring fitted system.

As a prolongation of the said floor 9 and on the same level at the rear end of the coach body there is fitted a folding landing or platform 10 Figs. 2 and 3 intended not only to permit of the utilization of the full capacity of the coach for the transport of patients, but also to facilitate the bringing in of the stretchers to the spring supported framing, and in addition, when folded up serves the purpose of a guard to prevent the falling out of patients traveling seated.

The connection of each set of two "flexor" elements 4 to each upright 3, Figs. 2, 3, 4, 5, 11 and 12, etc., is effected by means of a universal coupling 5 with the object of permitting both horizontal and vertical movement.

The connection of each set of two "flexor" elements 4 to the spring supported framing 1, Fig. 2, is made through the medium of a special bracket 6, Figs. 2, 3, 5, 13 and 14 on Cardan's principle for the purpose of providing also for vertical and horizontal movement.

From the foregoing description it will be seen that the arrangement of the spring supported framing is of suitable form to allow all the motions which may be caused by the irregularities, however great, of the ground, variations in speed and even of the effects of the application of the brakes.

It is not however sufficient to allow these motions to take place in a disordered fashion; it is necessary that the conditions making for comfort shall be constantly maintained whatever forces may come into play. For this purpose the common or ordinary spring will not suffice. It was therefore necessary to find a "flexor" element capable of fulfilling the two following conditions; smoothness of the movements of the spring and to damp gently and within a determined stroke (of the spring) all the violent shocks arising from the passage of the vehicle over a depression in the ground, and from the application of the brake.

This "flexor" element is shown in Figs. 6 and 7 and to render the matter still clearer details are given in Figs. 8, 9 and 10.

The "flexor" element Fig. 7 consists essentially of a steel cylinder 11, a piston 12, a piston rod 13, two pairs of steel helical springs, the pairs acting in opposition to each other 14, 15 and 16, 17; a throttling or brake rod 18 and two chambers 19 and 20.

The "flexor" element 4 being connected in the manner hereinbefore described, by means of the head 21 of the piston rod 13 Figs. 7 and 12 and of the trunnions 22 of the same Figs. 7 and 8 any gentle movement in either sense is absorbed by the springs 14, 15 or 16, 17 as the case may be. If however the force to be resisted unduly exceed the safe load of the spring it becomes necessary to restrict the stroke of the piston to the safe deflection.

For this purpose the chambers 19 and 20 are to be filled with glycerin, communication for this purpose being established by means of the holes 23, 24 and 25 Figs. 7 and 9 in the throttling spindle.

When the surface 26 and 27 slides upon the throttling spindle 18, in the direction, for example, of the arrow 28 Figs. 7 and 9 and its movement causes the point 27 to pass beyond the point 30 Fig. 9, the surface 26 and 27 commences to close a channel 30 and 31 of triangular section, gradually restricting thereby the area for the passage of glycerin from chamber 19 to chamber 20, and therefore preventing the movement of the piston 12 beyond the point 31 Figs. 7 and 9, seeing that the cup-leather 32 presses upon the glycerin itself and prevents further movement of the piston 12 except in so far as any very slow movement, imperceptible in practice, may take place due to a slight leakage of glycerin between the throttling rod 18 and the surface of contact 26 and 27. The same effect takes place when the force is exerted in the direction of the arrow 29 Figs. 7 and 9, since when the point 26 arrives at the commencement 34 of the other triangular channel of Fig. 8, the area for the passage of glycerin from chamber 20 Figs. 7 and 8, commences to decrease gradually and continues so to do until it becomes zero when the point 26 reaches the point 35 of the same channel Fig. 7.

In order to provide as far as possible for the practical adjustment and reduction to the minimum of vibrations of small amplitude, which cause the greater discomfort there is provided a movable ring 36 Figs. 7 and 9 which may be formed with openings of different sectional area so as to throttle, more or less as may be found desirable, the passage of glycerin through the channel which commences at 26 and terminates at 25 Figs. 7 and 9.

The piston rod 13 Figs. 7 and 10 is packed where it passes through the cylinder head by means of cup leathers 39 and 40 Figs. 7 and 10 and the cover 41 of the said cylinder head is jointed to the cylinder by metallic contact with V grooves 42 Figs. 7 and 10 turned in the cover 41 itself.

In order to avoid wear which may take place in the cover 41 Figs. 7 and 10 due to the working of the piston rod 13, a bronze bush 43 which may be easily replaced when worn is screwed into the cover.

The universal joint 5 is shown in detail in Figs. 11 and 12, and is riveted to the upright by its flange 44 Fig. 12.

Horizontal movement takes place about the pin 45 Figs. 11 and 12.

Vertical movement of the upper "flexor" element takes place about the pin 46, and of the lower "flexor" element about the pin 47 of Fig. 11.

The special bracket 6 by which each "flexor" element is connected to the spring supported framing is shown in detail in Figs. 13 and 14.

Horizontal movement takes place about the stepped bush 48 Figs. 13 and 14 which is cast on to the tubular vertical of the spring supported framing 1 and is further secured by safety screws placed in the mold when casting.

Vertical movement takes place about the bronze annular bearings 49 Figs. 13 and 14 which embrace the trunnions 22 Figs. 6, 7, and 8.

These annular bronzes 49 Fig. 13 are threaded endwise on the trunnions 22 Figs. 6, 7 and 8 and are secured to the brackets by the bolts 50, thus rendering it impossible that the trunnions leave their places by the slots 51 Fig. 13, so that in order to unship a "flexor" element from its bracket 6 it is only necessary to remove the bearings 49 Fig. 13 when the trunnions 22 of the "flexor" element may be passed out through the slots 51 Fig. 13.

Each annular bearing 49 Fig. 13 is furnished with elongated holes 52 for the securing bolts, in order that either of the spare bearings may be rapidly and easily fitted in its place.

Each bracket 6 is fitted to the spring supported framing 1, in two parts and in such a manner that the tubular vertical of the framing is embraced by the semicircular seating of the bracket 6 Figs. 13, 14 on one side and on the other side by the cover 53, the two parts being clamped together by means of the bolts 54 Fig. 13.

The bush 48 Fig. 13 is turned with a stepped surface as shown by the line 55, 56, 57, 58, etc., in Fig. 13, not only for the better distribution of the forces acting on the bush itself, but also with the object of increasing the bearing surface and in consequence of diminishing the wear of the bush 48 and of the bearing bracket 6 Fig. 13 which surrounds the said bush.

The tensor or stretching screw 8 is shown in detail in Figs. 15 and 16.

It consists of a horizontal bar 59 Fig. 15 in one piece with a handle 60, and of two cross heads 61 each perforated with two holes 62 to receive the joint pins which act as hinge pins for the tension links 7 Figs. 15 and 16.

The horizontal bar 59 is screwed at one end and smooth turned at the other. The latter part is free to turn smoothly in the hole provided for the purpose in one of the crossheads 61 and is kept in place longitudinally by an end washer 63 in turn secured on the horizontal bar by the pin 64.

It is the screwed part which on being screwed through one of the crossheads 61, by means of the handle 60 fulfils strictly the part of a stretching screw 8.

This tensor or stretching screw is so designed that when the face of the screwed crosshead 61 comes into contact with the face of the handle 60 as shown by the line 65 Fig. 15, the tension produced is sufficient, and the two parts of the spring supported framing 1 are constrained to remain at their exact and invariable distance from each other.

When the vehicle is to be used for the transportation of merchandise, the hospital stretchers 2, the spring supported framing 1, together with its floor 9, Figs. 2, 3, 4 and 5 are stowed in two aseptic compartments 66 and 67 as shown in Fig. 17.

The hospital stretchers 2, having been removed from their normal positions, are rolled up and bound to the sides of the vehicle, inside the aseptic compartments 66 and 67, Fig. 17, each being secured by its appropriate strap 68.

Next, the floor 9 Figs. 2 and 17 of each of the parts of the spring supported framing 1 is folded upward over the said framing against which it is secured by means of straps.

Then, the vertical pin, 45 Figs. 5, 11, 12 and 17, is taken out from the left side, of the rear part of the spring-supported framing, which is made to turn about the corresponding pin of the opposite side, Fig. 17, so as to assume a zig-zag form. Then the pin 45, of the right hand side of the forward part of the spring supported framing, is taken out which allows the framing to be turned about the corresponding pin of the opposite side Fig. 17 so that the universal coupling 5 Fig. 2, from which the pin has been removed, can be brought up to the small bracket 69 Fig. 17 and into which the pin 45, previously removed, is replaced in order to prevent the half spring-supported framing from becoming displaced. A similar procedure is followed with respect to the rear part of the spring-supported framing 1, which now presents a zig-zag form, in order to permit of the passage of its fore part so that the universal coupling 5, Fig. 2 at the left hand side Fig. 17, from which the pin 45 had been removed, may be brought to the small bracket 70, Fig. 17, in which the pin is replaced, in order to avoid the displacement of the forward part.

Following these operations the covers of the "formol" sterilizers 71 Fig. 17 are removed for the purpose of bringing about the aseptic treatment of the compartments 66 and 67, consequent on the evaporation of "formol" or other suitable disinfectant.

Finally the two sets, each of five doors 72 and 73 Fig. 3, are extended to occupy respectively the positions indicated by the lines 74, 75, 76 and 77 Fig. 17. The joints of these doors are in all cases lined or faced with felt, in order to prevent leakage of the vapor of the disinfectant employed.

Each door is provided, at its vertical edges, with an angle iron bar 78 Fig. 17 so that when the doors are extended as shown by the lines 74, and 75 Fig. 17, for example, the angle bar of the next forms a T for the whole height of the door, which serves not only to prevent warping of the door but also as a firm stay against pressure exerted by the merchandise.

Each door is joined to its neighbor by very strong hinges and in addition is secured by two catches, respectively at top and bottom in order to press the doors against the felt joints.

From the above description it will be clear that the whole of the space bounded by the planes 74, 75—75, 76—76, 77, Fig. 17 is fully available for the reception of merchandise, in proportion to the transporting capacity of the vehicle, which thus becomes transformed from a sanitary vehicle into a goods wagon without prejudice to its especial qualities for the transport of sick or wounded, since the stowage of the hospital stretchers, and of the spring supported framing with its own floor, in the two aseptic compartments preserves these completely from any infection during the transport of merchandise.

We now pass to the description of the manner in which the stretchers are shipped into their traveling positions, and also of the respective appliances of the special system destined to accomplish that end.

When each stretcher has been placed upon the floor 9 of the spring supported framing 1 Fig. 2 by means of the hinged inclined plane, and lifted by the hoisting apparatus to a level slightly above the plane of its traveling position, the removable cross bearer 79 Fig. 18 which connects the lower bars 80 of a pair of frames, each comprising supporting bars 80 and 81 Figs. 4 and 18, is slipped in place. The stretcher is then allowed to rest upon the said cross bearer 79 Fig. 18, through the roller wheels 82 Fig. 19, mounted on the ends of the side bars of the stretcher. The stretcher is then traversed to the right or left between the bars 80 and 81, according to the space available until it reaches its traveling position. The pin 83, Fig. 18 carried by the bars 80 and 81 is then shot into the clips 84 Fig. 18, by which means the stretcher is prevented from running back since the flanges 85 Fig. 19 of the roller-wheels nearest to the center plane of the vehicle bear against the pins 83 Fig. 18.

To proceed with the stowage of the stretchers at the various levels and in the spaces available, the cross bearers 79 Fig. 18 are removed and the afore described operation is repeated for each stretcher.

In order to lower the stretchers to the floor 9 of the spring supported framing 1, the procedure is the exact inversion of that described.

In order to bring in the stretchers from outside to the floor 9 of the spring supported framing 1, Fig. 2, the ends 86 of the hinged inclined plane Figs. 20 and 21 are linked to the rests provided on the platform or landing 10 Fig. 20 and the legs or columns 87 Fig. 20 of the said plane are lowered so that the plane is firmly supported.

Figure 19:
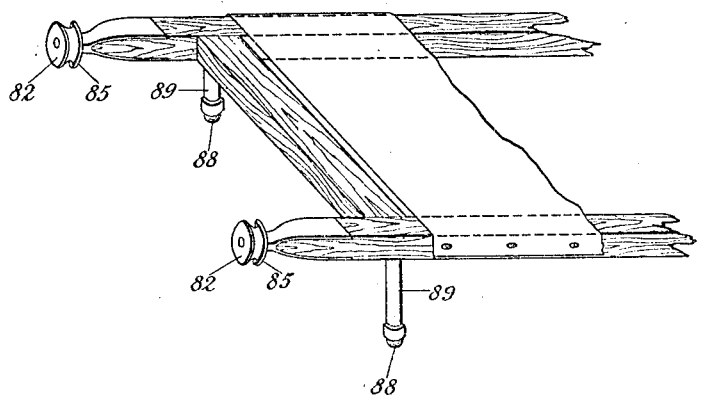
Fig. 19 is a perspective view of one of the ends of a stretcher.

The spheres 88 of the feet 89 of the stretcher Fig. 19 are allowed to rest upon channeled rails of semicircular section let into the side booms 90 Fig. 20 so that the stretcher may be run upon its four spheres 88 Fig. 19 along the hinged inclined plane Fig. 20 until it reaches and rests upon the floor 9 of the spring supported framing 1, the latter also being provided with channeled rails, with the object of compelling the stretcher to take up the position necessary that it may be lifted by the hoisting apparatus.

The hinged inclined plane Figs. 20 and 21 consists essentially of two side booms of wood 90 Fig. 21, kept at the proper invariable distance apart by means of cross bars 91, 92 and 93 the whole structure being rendered rigid by means of ties or links 94 Fig. 21; and of two legs or columns 87 Fig. 20 already referred to; and of two crutches 95 Fig. 20 to each side boom which with the tie bars 96 form with each side boom a girder, strong and at the same time light.

The cross bars 91 Fig. 21 are shown to a larger scale in Figs. 23 and 24 together with their respective hinge joints.

In Fig. 24 is shown the method of fixing the crutches 95 to the side booms 90.

In Figs. 25 and 26 is shown the manner in which the legs or columns 87 Fig. 20 are connected to the side booms 90.

In Fig. 27 is shown the manner in which the upper ends 86 Figs. 20 and 21 of the side booms are constructed so as to be capable of being securely and rapidly linked to the landing or platform 10 of the floor 9 of the spring supported framing 1, Figs. 20 and 27.

In Fig. 28 is shown in plan the hinge plate 97 Fig. 27 which is fixed to the landing or platform 10 of the floor 9 Figs. 20 and 27 and which supports the upper end 86 of the hinged inclined plane Figs. 20, 21 and 27 so that the latter may be rapidly and securely slipped in place.

In Fig. 29 is shown the afore mentioned hinged inclined plane completely shut or folded up and ready to be stowed between the longitudinals 98 Fig. 4 and resting upon two wooden rails of suitable dimensions.

The hoisting apparatus for lifting the stretchers is mounted outside the vehicle and below the hood which protects the driver.

It consists of an endless worm 99 Fig. 30 and a worm-wheel 100 fixed upon the axle 101, which axle carries at each end a sprocket wheel 102—103 Fig. 31. The worm 99 is fixed upon or forms part of an axle 104 which carries at its end another sprocket or chain wheel 105. Engaging with the latter is an endless chain 106, and from the sprocket wheels 102 and 103, respectively are led the chains 107 and 108, to the inside of the body of the vehicle where they are led each over its own pulley 109 and 110 Fig. 31, placed in proper position for lifting the ends of the stretchers, which latter are raised by the said chains. Agreeably to this disposition when the endless chain 106 Fig. 30 is pulled steadily the sprocket wheels 102 and 103 Fig. 31 are caused to rotate through the medium of their axle 101 on which is fixed the worm wheel 100 Fig. 30 caused to rotate in its turn by the worm 99 which receives motion from the endless chain wheel on the same axle, and by this means therefore it is insured that the stretchers rise parallel to themselves and to the horizontal plane, which is an advantage for the sick or wounded, since the hoisting apparatus is furnished with two chains 107 and 108 one for each end of the stretcher as is shown schematically in Figs. 30 and 31.

In the body of the vehicle various arrangements have been made with the object of rendering the "special system" complete and at the same time maintaining a uniform temperature, and so avoiding rapid variations in the surrounding inside atmosphere and rendering the same hygienic by suitable ventilation.

Abrupt variations of temperature are avoided by means of an insulating air space bounded by the interior and exterior linings 111 and 112 Figs. 3 and 4.

In order to avoid rise of temperature in the interior of the body of the vehicle, the insulating layer of air is from time to time renewed, a condition which is taken advantage of in order to effect the extraction of impure air.

This insulating air layer is in communication with the interior of the body of the vehicle by way of the openings 113 Figs. 4 and 5 and with the external atmosphere by the channel 114 and 115 Fig. 4.

Air from the external atmosphere is introduced into the interior of the body of the vehicle by way of the channels 116 Figs. 1 and 5.

This process of withdrawing impure air from the interior and introducing fresh air from the exterior atmosphere is effected although more slowly even when the vehicle is at rest, especially if the external temperature is relatively high, since the insulating air layers when heated by the external atmosphere rise due to the difference in density, and discharge themselves totally through the channel 114 and 115 Fig. 4 from which they are expelled to the atmosphere, thus causing a suction from the interior of the vehicle through the openings 113, Fig. 5.

When the vehicle is in motion the aspiration above described becomes more active, since the air current established through the channel 114 and 115 Fig. 4 due to the velocity of the vehicle not only intensifies the said aspiration but also accelerates the introduction of air from the exterior through the channels 116 Fig. 5.

Summarizing—By the displacement of the insulating air layers two objects are attained viz:—the rendering of the internal temperature as uniform as possible and the renewal of the interior atmosphere of the body of the vehicle.

The two aseptic compartments 66 and 67 Figs. 4 and 17 to which reference has already been made are absolutely protected from dust from the outside, and are in communication with the atmosphere only by way of the openings for ventilation 113 Fig. 5.

The result of this arrangement is that as the vapor from the "formol" or other selected disinfectant is given off in increasing quantity such vapor takes place of the air layers in the upper part of the aforesaid aseptic compartments until they complete the expulsion of the air through the orifices 113 Fig. 5. Consequently when the interior space of the two aseptic compartments becomes completely filled by the said vapor from the disinfectant, the said vapor commences to pass out by the aforesaid orifices, through the air spaces inclosed between the inner and outer coverings 111 and 112 Fig. 4 until it reaches the outlet channel 114 and 115 Fig. 4.

This passage of the disinfecting vapor over the course described can only result in the disinfection of all that lies in the path which constitutes an additional advantage from the hygienic point of view.

In order that the transformation may be made from a sanitary vehicle to one for the transport of merchandise with due propriety, the white ground 117 Fig. 1 upon which the Red Cross 118 is painted, is executed on a portable plate, or on other suitable material, on the back of which the number and series of the coach may be painted and by the reversal of which the vehicle loses its sanitary character.

The lighting is effected by means of four circular glass sidelights 119 Figs. 1 and 5 fitted, two on each side of the coach body.

In the rear of the spring supported framing, that is in the space between it and the rear of the vehicle there may be installed a case for provisions and another for medical stores, the two cases being strapped on to the spring supported framing.

The spring supported framing may be covered or protected by a canvas screen for the better protection of the sick or wounded from dust. This canvas screen may, when the vehicle is transformed for the carriage of merchandise, be stowed in one of the aseptice compartments.

From the above description it will be seen that the "special system" which is the subject of the present invention possesses the great advantage of realizing the best conditions for comfort and hygiene in the transport of sick or wounded, and at the same time is so devised that it permits of the transformation of the sanitary vehicle into one for the carriage of merchandise, being easily and rapidly made, without the objection that such transformation, or even of the carriage of merchandise, can possibly prejudice its very special qualities as a sanitary vehicle.

The part of the special system which relates to the springs and respective fittings, constituted as already described by the "flexor" elements, and spring supported framing, may be applied, even with variation in the position of the said "flexor" elements, to any vehicle, whether drawn by animals, self moving, for use on railways, etc., and whether for the carriage of passengers or of merchandise.

I claim as a novelty and of my exclusive invention, and desire to protect by "Letters Patent" in the United States of America.

1. A vehicle of the kind described, comprising a framing for supporting stretchers, "flexor" elements for suspending said framing, upright columns fixed to the underframe of the vehicle and to which said "flexor" elements are attached, said "flexor" elements being also attached to said framing to support the same, flooring detachably supported by the framing, and detachable connections for said elements and framing whereby said elements, framing and flooring may be easily and rapidly inclosed in special sub-divisions of the vehicle when the vehicle is to be used for the transportation of merchandise.

2. A vehicle as described in claim 1, wherein the interior of the vehicle is provided with a plurality of compartments, one of which compartments is spaced above the flooring when the flooring is in place on the framing, said compartments being so arranged as to insure a uniform temperature, avoid abrupt change of temperature, and maintain a hygienic atmosphere by means of suitable ventilation.

3. A vehicle as described in claim 1, wherein there is also provided a detachable hinged plane adapted to be connected at its upper end to the rear end of said flooring when the latter is in place on the framing.

4. A vehicle as described in claim 1, wherein there is also provided a hoisting apparatus including means for detachably engaging stretchers and operable to move the stretchers from the exterior of the vehicle to the level of the places which the stretchers are to occupy during transit.

5. In a vehicle of the kind described, comprising a framing, "flexor" elements for suspending the framing independently of the underframe of the vehicle, uprights fixed to the underframe of the vehicle and to which said elements are attached, said framing comprising two members placed one at the fore end and one at the rear end of the vehicle and supported by said elements in such a manner that they constantly occupy predetermined relative positions to one another laterally of the vehicle, and adjustable tie-rods including a "tensor" or stretching screw for securing said members in predetermined relative positions longitudinally of the vehicle.

6. A vehicle comprising a coach body including a flooring, a resiliently supported framing disposed above the floor, and a foldable floor independent of the floor of the coach body and supported by said framing, said foldable floor being adapted for the reception of stretchers.

7. In a vehicle of the kind described, the combination of eight "flexor" elements arranged in pairs, the elements of each pair acting in opposition, uprights on the vehicle, universal joints connecting said elements to said uprights, a framing, and brackets including Cardan joints whereby said framing is connected to and supported by said elements.

8. In a vehicle of the kind described, in combination, an auxiliary framing, pairs of "flexor" elements resiliently supporting the framing relative to the vehicle, a plurality of uprights on the vehicle, a universal coupling connecting each pair of elements to a particular upright, the said universal coupling comprising a flange by which it may be riveted to the said upright, a pin about which all motion of the attached elements in a horizontal plane takes place, and two other pins about which all movement of said elements in a vertical plane takes place.

9. In a vehicle of the kind described, the combination of a framing adapted to be resiliently carried by the vehicle, a plurality of "flexor" elements between the framing and the vehicle and each provided with two trunnions, a bracket constructed upon Cardan's principle by which each "flexor" element is connected to the framing, the said bracket including a sleeve portion in two parts and of stepped interior and of such form that it may be made to embrace the said spring-supported framing, said sleeve portion having bolt holes whereby it may be tightened by means of bolts, and a stepped bronze fitting on the framing and adapted to be interposed between the framing and the sleeve portion of the bracket when the said portion embraces the framing, the said bracket having two annular bearings for embracing the two trunnions of the connected "flexor" elements to permit movement of the elements in a vertical plane.

10. In a vehicle of the kind described, a ventilating system therefor comprising exterior and interior side walls for the coach body inclosing and insulating an air space whose contents may from time to time be renewed, openings in the lower part of the coach body leading to said air spaces, a structure provided in the upper part of the body and providing an insulating air space in communication with the interior of the coach and with the external atmosphere, and a structure providing two channels in the upper part of the coach body for the admission of air from the external atmosphere.

11. In a vehicle of the kind described, the combination of a spring-supported framing on the vehicle, detachable flooring for the framing, adjustable stretchers, the parts being so constructed and arranged as to provide two compartments within the vehicle whereby said framing, flooring and stretchers may be rapidly and easily stored in said compartments, aseptic means in said compartments, and universal-movement detachable joint connections between the parts for facilitating such storage, thereby to provide a convenient space in said vehicle for transporting merchandise isolated from said framing, flooring and stretchers.

12. A vehicle as described in claim 11, wherein there is also provided a plurality of separately extensible door sections to provide walls shutting off from the merchandise transporting space the compartments containing the asceptic means when said framing, flooring and stretchers are stored in said compartments, each door section being provided at its side edge with angle bars to form T-bars between adjacent sections to provide tight and secure joints between the sections.

13. A vehicle as described in claim 11, wherein the framing comprises laterally arranged relatively movable frames, and uprights are provided on the vehicle at its four corners and brackets are mounted on said uprights, and spring-suspension supporting elements for the framing are connected to the brackets and the framing to normally hold the framing in place to support the flooring, and readily detachable universal joints provided on the brackets for directly engaging the spring elements whereby a spring element may be disconnected from a side portion of its frame and reconnected to a side portion of the other frame which will be diagonally opposite the first-mentioned frame's side portion when the frames are in position for supporting the floor.

14. In a vehicle of the kind described, in combination, a vertical supporting structure, supports thereon at different levels for receiving stretchers, and means for yieldingly holding the structure from displacement laterally longitudinally and vertically of the vehicle, substantially as described.

15. A vehicle as described in claim 14, wherein the stretchers are provided with flanged rollers on pintles arranged longitudinally of the stretchers, and wherein the supports are constructed as tracks running laterally of the vehicle and on which the rollers may be mounted to hold the stretchers against displacement longitudinally of the vehicle.

16. A vehicle as described in claim 15, wherein said holding means includes a removable pin for adjustment to abut against one of the rollers of each stretcher to prevent displacement of the stretchers laterally of the vehicle.

In testimony whereof I affix my signature in presence of two witnesses.

JOÃO GUIMARÃES CARREIRA.

Witnesses:
AMERICO FARINDO D'ALMEIDO,
JUETROGUDO COLUMBO LAMPAÉZ.

Copies of this patent may be obtained for five cents each, by addressing the "Commissioner of Patents, Washington, D. C."